Oct. 4, 1966    L. E. THOMAS ET AL    3,276,607
MACHINE TOOL

Filed Sept. 10, 1964    6 Sheets-Sheet 1

INVENTORS
Lucius Earl Thomas
Martin Friedland
Frederick W. Schneider
BY David W. Pessen
ATTORNEYS Oct. 4, 1966 L. E. THOMAS ET AL 3,276,607

MACHINE TOOL

Filed Sept. 10, 1964 6 Sheets-Sheet 6

INVENTORS
Lucius Earl Thomas
Martin Friedland
Frederick W. Schneider
BY David W. Pessen

ATTORNEYS

3,276,607
MACHINE TOOL

Lucius E. Thomas, Norristown, Martin Friedland, Flourtown, Frederick W. Schneider, Audubon, Norristown, and David W. Pessen, Philadelphia, Pa., assignors to The Warner & Swasey Company, Cleveland, Ohio, a corporation of Ohio
Filed Sept. 10, 1964, Ser. No. 395,448
8 Claims. (Cl. 214—1.3)

The present invention relates to turret punch presses, particularly of the character which are numerically controlled, in which the work piece to be punched is automatically positioned by a control system in accordance with a prearranged program.

A purpose of the invention is to produce a turret punch press, especially of the numerically controlled type, in which the work table holding the work piece is positioned at much greater speed than in present turret punch presses, whereby a greater work output in a given time can be obtained.

A further purpose is to produce a turret punch press, especially a numerically controlled turret punch press, in which the work table holding the work piece is positioned to greater accuracy than in present turret punch presses, so that the quality of the work produced is improved and the number of rejections is correspondingly reduced.

A further purpose is to obtain smoother operation of table travel in a turret punch press, by reducing the tendency of the table to jump when it is subjected to high accelerations.

A further purpose is to drive the table by a gear rack rigidly attached to the table and a pinion meshing with the gear rack, the pinion having circular-pitch teeth.

A further purpose is to manipulate a table by two parallel gear racks rigidly attached at opposite ends of the table, two pinions driving said gear racks respectively, two sets of speed reducing means driving said pinions in synchronism, a cross-shaft connecting said two sets of speed reducing means, a rotary hydraulic motor, and mechanism connecting the cross-shaft to said rotary hydraulic motor.

A further purpose is to manipulate a table by a gear rack rigidly attached to said table, a pinion driving the gear rack, a shaft carrying the pinion, roller bearings supporting the shaft (the roller bearings having a product NL greater than 10D, where N is the number of rollers in the bearing, L is the axial length of each bearing, and D is the shaft diameter), a rotary hydraulic motor and speed reducing mechanism connecting said shaft to said rotary hydraulic motor.

A further purpose is to manipulate a table by a gear rack rigidly attached to the table, a pinion driving the rack, a shaft carrying the pinion, tapered roller bearings supporting the shaft (said tapered roller bearings being preloaded in the axial direction by an amount substantially equal to $1.8R'\tan\theta$, where $R'$ equals the radial bearing load and $\theta$ equals one-half the included roller-center line angle of said tapered roller bearings), a rotary hydraulic motor, and speed reducing mechanism connecting said shaft to said hydraulic motor.

A further purpose in combination with other features of the invention is to further increase the natural frequency by driving the table by a rotary hydraulic motor acting through a rack attached to the table, and to provide a velocity measuring feedback mechanism directly coupled to the hydraulic motor and a coarse position measuring feedback position also directly coupled to the hydraulic motor, but with a fine position measuring feedback mechanism directly connected to the table.

A further purpose is to drive a table by a gear rack rigidly attached to the table, a pinion driving the rack, a rotary hydraulic motor, speed reducing mechanism, connecting said pinion to said rotary hydraulic motor, a base, a set of guide rails mounted on said base, and a set of rollers attached to the table, rolling along said rails and constraining said table in a vertical direction, preferably by engagement of one of said rollers with an upwardly inclined surface.

A further purpose is to adjust the clearance between said rollers and said rails.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

The present invention is concerned primarily with improving the mechanism for manipulating the work table in a turret punch press, particularly of the type which is numerically controlled.

In one type of numerically controlled turret punch press currently in use, the work table is driven in the crosswise and in-and-out directions by hydraulic cylinders. These cylinders must be at least as long as the length of the table travel. This table travel in some of the larger presses can be as much as 120 inches, so that the cylinders are very long and very long columns of oil are present inside these cylinders.

Although oil is often regarded as an incompressible fluid, it is well known that all fluids, including oil, are subject to some compressibility. The resulting stiffness (spring constant) of a long column of oil is given by the following well-known equation:

$$k = AB/L$$

where $k$ is the stiffness or spring constant, and is defined as the ratio of the applied force to the resulting deformation, L is the length of the column of oil in inches, A is the cross sectional area of the column of oil in square inches, and B is the bulk modulus of the oil in p.s.i. and might be of the order of 200,000 p.s.i. for a typical hydraulic oil. Since the length L is very large, it will be clear that the stiffness $k$ will be correspondingly small. For example, in one typical turret punch press in present use, the length L is approximately 50 inches, and the effective piston area is approximately 7.8 square inches, so that the stiffness $k = AB/L = 7.8 \times 200,000/50 = 31,200$ lb./in.

In the above-mentioned press, the mass of the table which has to be moved by the hydraulic cylinder is equal to about 3.1 lb.-sec.$^2$/in. This mass, together with a column of oil, constitutes in effect a spring-mass system, and as well known from the theory of vibrations, will have a natural frequency as follows:

$$w = \sqrt{k/m}$$

where $w$ is the natural frequency in radians/seconds, $k$ is the spring constant of the spring, and $m$ is the vibrating mass. In the above example, this equals approximately $w=100$ radians/second which is a relatively low figure.

The work table is positioned automatically by an automatic control system according to a prearranged program as well known in the art, so that each hole will be punched at its exact desired location. As will be understood by those skilled in the art of automatic control, the speed of response of the work table than can be attained depends to a large extent on the natural frequency of the table. The lower this natural frequency, the longer it will take to move the table position from one hole to the next and the lower will be the number of holes that can be punched by the turret punch press per minute. Also, a low natural frequency in the work table makes it necessary to use a lower loop gain in the control system in order to prevent instability and such lower gain produces a larger static error in the positioning of the table. It is, therefore, very desirable to increase the natural frequency of the work table as much as possible. However, it has been found to be impossible to increase this natural frequency to an appreciable extent in work tables driven by hydraulic cylinders since the natural frequency is inherently limited by the low stiffness of the long column of oil within the cylinder.

One solution of the above problem is to drive the work table by means of a rotary hydraulic motor coupled to the table through mechanical gears, rather than using a long hydraulic cylinder. Suitable rotary hydraulic motors, either of the vane type or of the piston type, are readily available commercially. Since such motors operate at fairly high rotational speeds, they have to be connected to the work table through a gear reduction drive terminating in a pinion. This pinion drives a gear rack rigidly attached to the table. Driving by such a rotary hydraulic motor, however, introduces a number of problems. Ordinarily, the required gear reduction drive introduces a great deal of mechanical compliance into the system (compliance being defined as the reciprocal of the stiffness), so that the natural frequency of the work table will again be lower than would be desirable. Another problem is that the backlash between the pinion and rack, if included within the feedback loop of the control system, tends to cause instability of the loop. Such backlash makes the use of low control-system gains necessary to reduce the tendency toward instability and such low control-system gains produce a large static positioning error. Another problem is that the higher table accelerations which are made possible by the use of the rotary hydraulic motor tend to cause the table to jump up and away from the rails upon which it rolls, producing excessive noise, vibration and wear during operation.

We have discovered that higher natural frequency can be obtained and the various other problems can be solved, by changing the drive of the work table. Since the mechanical compliance is most detrimental in that part of the drive where the velocity has already been reduced, it is important to make the pinion shaft and shaft mounting as stiff as possible. The main source of compliance in the pinion shaft is the shaft mounting, consisting of a pair of roller bearings. The stiffness of these roller bearings is approximately proportional to the length of contact between the bearing rollers and the outer race. This length of contact is proportional to the roller length and also to the number of rollers in the bearing. Thus, other factors being equal, that bearing should be selected which possesses the highest value of the product NL, where N is the number of rollers and L the roller length measured in the axial direction.

The product NL should be at least equal to 10D, where D is the bore diameter or the diameter of the shaft on which the bearings are mounted.

This requirement is arrived at as follows: the two principal elements contributing harmful compliance to the drive system are the shaft, which contributes torsional compliance, and the shaft bearings, which contribute compliance depending upon their dimensions.

The torsional shaft stiffness converted to an equivalent stiffness at the rack pinion is equal to $$K_{shaft} = \frac{\pi D^4 G}{32 L} \times \frac{4}{D_p^2} \text{ lbs./inch}$$

where $D$ = shaft diameter, $D_p$ = pitch diameter of the pinion driving the rack, $L$ = shaft length and $G = 11.5 \times 10^6$ = torsional modulus of elasticity for steel. To obtain a high value of $K_{shaft}$, L should be made as short as possible, but it will generally not be possible to make it shorter than $L=2D$, since sufficient length must be provided to mount the bearings and gears. The value $L=2D$ is therefore used. Furthermore to obtain a high value of $K_{shaft}$, D should be made as large as possible, but it is generally not practical to make it larger than the pinion diameter $D_p$. Accordingly the value $D=D_p$ is used. Substituting these values in the above relation, the following is obtained:

$$K_{shaft} = \frac{(\pi)(D^4)(11.5)(10^6)(4)}{(32)(2)(D)(D^2)} = 2.26 \times 10^6 D$$

Turning now to the bearing stiffness, experiments have shown that the radial stiffness of tapered roller bearings is very roughly equal to $$K_{bearing} = 0.25 \times 10^6 \, (NL)$$

provided the axial preload applied to the bearings is calculated according to the formula specified in the specification below.

If two bearings are mounted on the shaft with an overhanging load (i.e., the load acts at the pinion which is mounted outside the bearings) then the stiffness of the assembly is no more than one-half of each individual bearing or $$K_{bearing \; assembly} = 0.12 \times 10^6 (NL)$$

In order to prevent the mechanical compliance of the bearings from having an unduly great effect on the compliance of the whole drive, it is important that the stiffness of the bearing assembly be no less than one-half the shaft stiffness. This may be expressed as $$0.12 \times 10^6 (NL) = \tfrac{1}{2} \times 2.26 \times 10^6 D$$

$$\text{or } NL = (2.26/0.24) D = 9.4 D$$

From this, the requirement is determined that the product NL should be equal to or greater than 10D. In an actual embodiment of the device which has been operated successfully $D=2.375$, so that NL should be at least 24. In the actual case $N=22$ and $L=1.38$, so that $NL=30$.

The shaft bearings are preferably tapered roller bearings, since such bearings can be preloaded with any desired amount of axial preload. Such a preload tends to compress the rollers slightly along the lines of contact with the bearing race, so that the contact surface will be greater for the same amount of contact length.

As the contact surface is increased, the bearing stiffness also increases. Thus, it is desirable to increase the preload as much as possible so as to obtain very stiff bearings. However, as the preload increases, the bearing frictional loss also increases. It has been found that the axial preload for maximum effectiveness in the present invention should be approximately equal to the following:

$$P = 1.8 R \tan \theta$$

where P is the axial preload in pounds, R is the radial bearing load in pounds and $\theta$ is one-half the included roller-center line angle of the tapered bearing.

For values of P greater than the value suggested above, a point of diminishing returns is rapidly reached, where the bearing stiffness increases only very little but the bearing friction increases appreciably.

To reduce the above-mentioned effect of backlash between the pinion and the gear rack on the stability of the control system, position and velocity feedback devices are mounted directly on the hydraulic motor, so that the feedback signal received by the control system reflects the position and velocity of the motor rather than that of the work table. In other words, the shaft of the motor is directly connected to the shafts of the position and velocity feedback devices. The backlash between pinion and rack is now excluded from the feedback loop, so that stability is not adversely affected by the backlash. Such a system will, however, lower the accuracy attainable in positioning the work table, since the position feedback system will not sense any shift of the work table position within the backlash region. To remove this drawback, an additional position feedback device is mounted on the work table and is used for final accuracy positioning, while the feedback device mounted on the motor is used only for initial coarse table positioning. In this manner, the backlash has very little effect on the system stability, and yet high positioning accuracy is maintained.

While direct operation of the position and velocity feedback devices from the hydraulic motor is not broadly part of this invention, it contributes with other novel features of the invention to make the higher natural frequency possible.

Since the feedback devices mounted on the hydraulic motor are subject to rotational movement, while the work table is subject to linear movement, the mathematical relationship between motor rotation and table movement will include the factor $\pi = 3.14159 \ldots$, as long as standard diametral-pitch gears are used in the gear reduction drive, that is, those whose diametral pitch is an integral or rational fraction in inches. To illustrate, assume that a pinion is used with an integral number diametral pitch, say $P_d = 6$ per inch. Assume further that the pinion has $N = 20$ teeth, and that the gearing from the hydraulic motor up to the rack pinion produces a speed reduction of 10:1. Since the diametral pitch $P_d$ is defined as $$P_d = N/D$$

where $N =$ the number of teeth and $D =$ pitch diameter, the pinion will have a circumference $$= \pi D = \pi N/P_d = (3.14159)(20)/6 = 10.47197 \ldots$$

Because of the 10:1 speed reduction each revolution of the hydraulic motor will thus produce a table motion of 1.047197 . . . . inch. Since the coarse position feedback device is coupled directly to the hydraulic motor, it revolves at the same rotational speed. Assuming, for the sake of illustration, that each revolution of the coarse position feedback device produces 1,000 electrical pulses fed into the digital control system, it will be evident that each pulse represents a table motion of 0.001047197 . . . inch. This figure is extremely inconvenient to work with, since the whole program of the control system is based upon units of 0.001 inch.

The above difficulty is caused by the fact that the factor $\pi$ has to be included in the above calculation. Since $\pi$ is approximately equal to 22/7, it can almost be eliminated by introducing an additional pair of gears having a gear ratio which includes the factor 7/22, such for example as 21/22 equals $3 \times 7/22$. If such a pair of gears is introduced into the gear train then each revolution of the hydraulic motor (or coarse position feedback device) produces a table motion equal to $$\frac{\pi N}{P_d} \times \frac{1}{10} \times \frac{21}{22} = \frac{(3.14159)(20)(21)}{(6)(10)(22)} = 0.9995968 \ldots \text{ inch}$$

This is almost, but not quite, equal to 1. If each pulse generated by the feedback device were made equal to 0.001 inch it is obvious that there will be an error of $\frac{4}{10,000}$ inch in the position indication and, since the error would be accumulative, it would amount to an error of 0.020 inch for a 50 inch table travel.

To eliminate this error due to the $\pi$ conversion completely, we use a pinion having an integral number circular-pitch in inches, rather than an integral number diametral pitch. For example, if the circular-pitch is chosen as $P_c = \frac{1}{2}$ inch, the pinion will have a circumference $$= P_c \times N = (\frac{1}{2})(20) = 10.000 \text{ inch}$$

Thus, one revolution of the hydraulic motor produces a table motion of exactly 1.000 inch and each pulse measures exactly 0.001 inch, with no inherent error whatsoever. If it is desired to use metric measurements, a similar circular metric pitch can be employed.

To prevent the above-mentioned problem of the table tending to jump away from the rails due to high accelerations made possible by the rotary hydraulic motor, the table of the present invention is made to roll on three sets of rollers. One set of rollers rolls on a horizontal surface which is upwardly directed, and acts to support the weight of the table. A second set of rollers rolls in a horizontal direction on a vertical axis and along a vertical surface, and this set of rollers acts to prevent sidewise shifting of the table. A third set of rollers rolls in the horizontal direction on an inclined axis and along an upwardly tilted surface, and thus constrains the table against an upward movement so that it cannot jump upward. Each of these tilted guide rollers is preferably mounted on an eccentric shaft, so that it can be adjusted to produce any desired amount of preload on the tilted rail surface. An alternative construction provides a third set of rollers which are not tilted but run along and below a horizontal rail surface.

The work piece must be driven in two directions, the crosswise direction and the in-and-out direction. This is accomplished by having the work table move in the in-and-out direction only, while a carriage mounted on the work table rolls along the work table in the crosswise direction. When the work table is moving in the in-and-out direction, it is moving toward or away from the turrets containing the punches and dies. The work table when viewed in plan is roughly C-shaped, with a narrow throat section perpendicular to the two outer arm sections, and with the turrets located in the general region of the throat. Since the throat is narrow, it is not practical to have the table drive mechanism attached to the table in the throat region. In previous presses, the table drive was attached to one of the two arms of the C of the table. This design, however, seriously reduces the natural frequency of the table, since the mass of the other arm of the C is coupled to the drive through the narrow and relatively compliant throat of the C. According to the present invention this disadvantage is avoided by driving both arms of the C simultaneously and in synchronism by means of a cross-shaft and a split drive which will be later described.

Using the various novel features of the invention described, it has been possible to produce a press wherein the table drive has a natural frequency of 375 radians/second, as compared to 100 radians/second previously obtained in a conventional press of similar size and capacity where the table was driven by a hydraulic cylinder. As a result, the new press has a much faster speed of response, and a much greater accuracy in the location of the holes punched.

Figure 1:
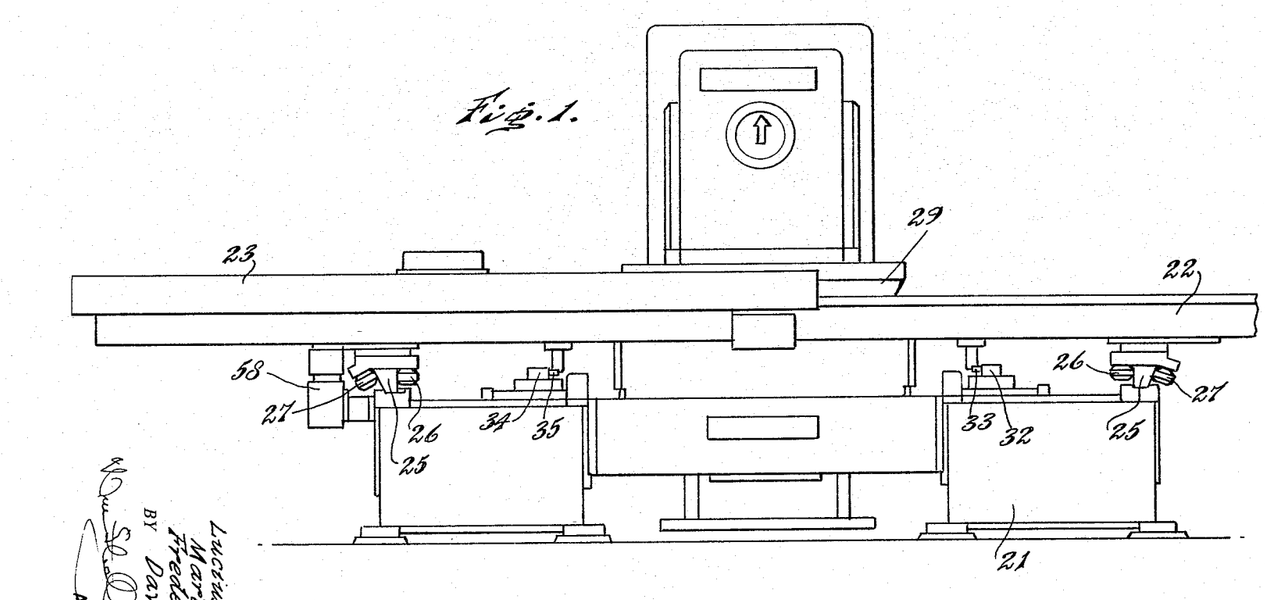
FIGURE 1 is a front elevation of a numerically controlled turret punch press of the invention.
Figure 2:
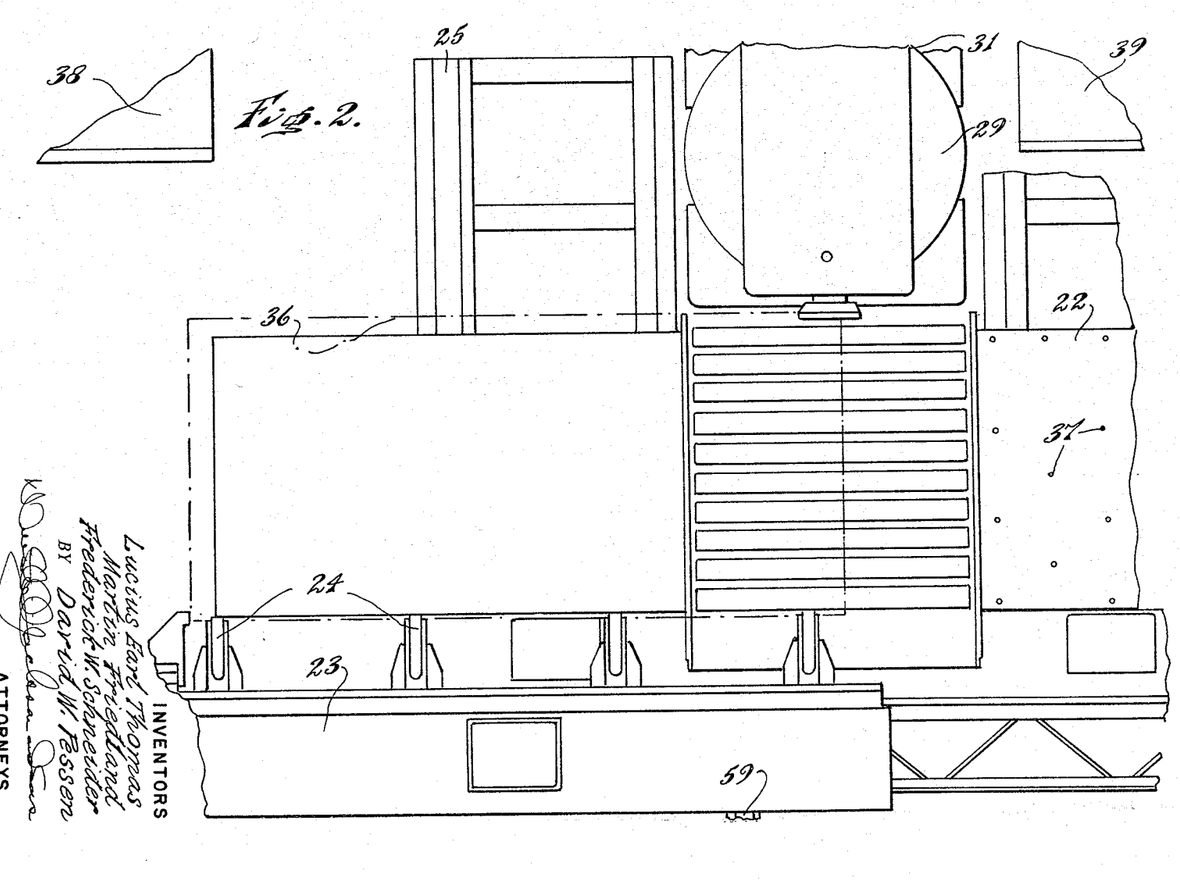
FIGURE 2 is a fragmentary plan view of the press of FIGURE 1.
Figure 3:
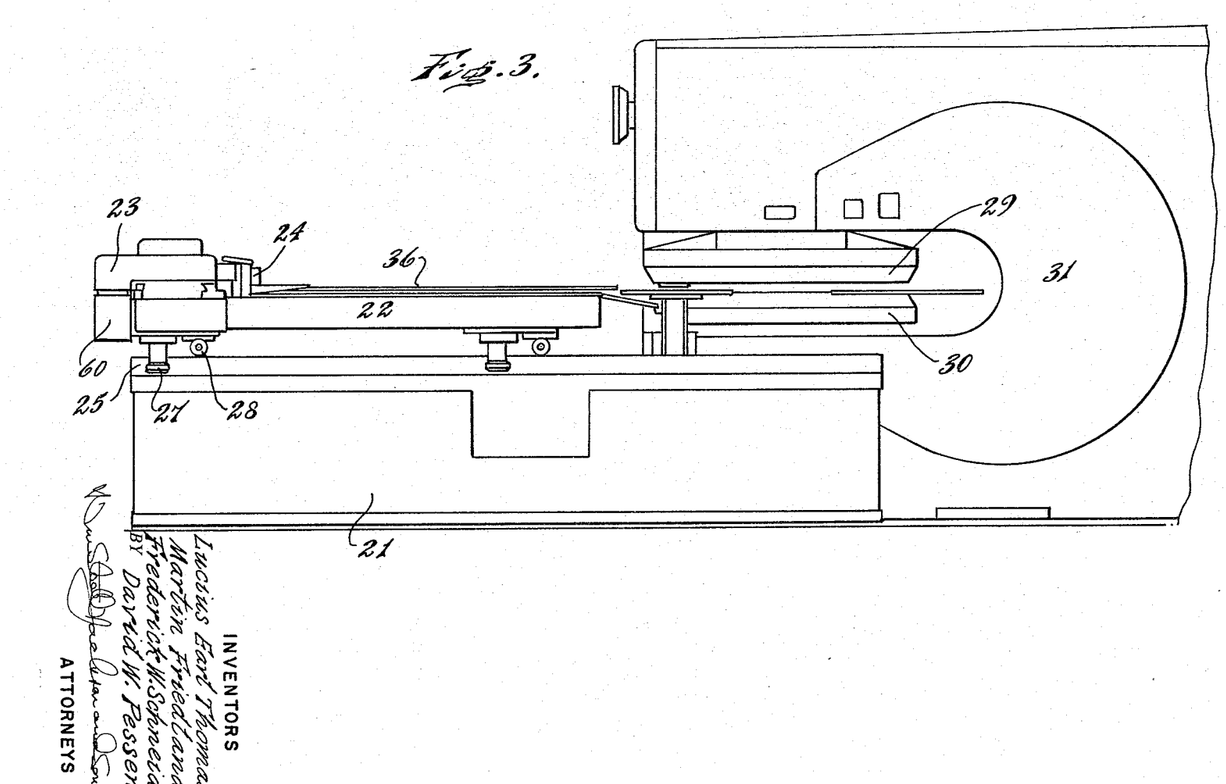
FIGURE 3 is a fragmentary side elevation of the press of FIGURE 1.

Considering now the drawings in detail and describing in illustration but not in limitation:

Referring specifically to FIGURES 1 to 4 inclusive, a base 21 supports horizontal rails 25, each rail in the embodiment shown including an upwardly directed surface, a vertical sidewardly directed surface and an upwardly inclined directed surface. A work table 22 rides along the rails 25 in the in-and-out direction by means of rollers 26 (FIGURE 1), 27 (FIGURES 1 and 3) and 28 (FIGURE 3).

Specifically, the rollers 28 engage an upwardly directed rail surface and support the weight of the table, rollers 26 engage lateral vertical surface and constrain the table in the crosswise direction and rollers 27, being tilted, constrain the table in the vertical direction and thus prevent the table from tending to "jump" upward during periods of high acceleration. On the under side of the table 22, racks 33 and 35 are attached to the table and extend parallel to the direction of table motion. The table is also connected to a position feedback pickup 58, which accurately measures the exact table position at any instant.

The position feedback pickup 58 can be of the Farrand "Inductosyn" type disclosed in U.S. Patent No. 3,064,218 and also described in detail in the catalog for Farrand Inductosyn Linear and Angular Micro Positioning Systems, issued by Farrand Controls, Inc. The position feedback system is described in U.S. Patent No. 2,086,151. Many other position feedback systems which are suitable are available on the market.

The carriage 23 rides along the table in a crosswise direction, and carries with it work holders 24 which clamp work 36, the work suitably being a sheet or plate of metal or other material to be punched. The carriage 23 rolls on rollers and rails which are similar to the rails 25 and the rollers 26, 27 and 28 but are not shown in the drawing. The only differences are that the rails for the carriage extend crosswise while the rails for the table extend in and out, and the rails for the carriage are mounted on the table while the rails for the table are mounted on the base. The carriage is connected to a position feedback pickup 60 (FIGURE 3) similar to the position feedback pickup 58, except that pickup 60 accurately measures the exact carriage position at any instant.

The main part of the press consists of a heavy press C-frame 31 (FIGURES 2 and 3) which mounts an upper rotatable turret 29 containing a number of different punches, and a lower rotatable turret 30 cooperating with the turret 29 and containing a number of corresponding dies. These turrets are rotatable automatically as well known by a control system, depending on the particular type of hole to be punched. This control system is not further described as it forms no part of the present invention.

A control console 38 (FIGURE 2) receives the desired punching program in the form of punched paper tape or the like and also receives feedback signals from the press, indicating table and carriage positions and velocities. The control console then transmits the proper control signals to a hydraulic unit 39 (FIGURE 2). The hydraulic unit 39 actuates hydraulic motors which drive the carriage and table respectively. Since the electronic circuits in the control console 38 and the hydraulic circuits in the hydraulic unit 39 form no part of the present invention and are in themselves well known, they are not further described.

Figure 4:
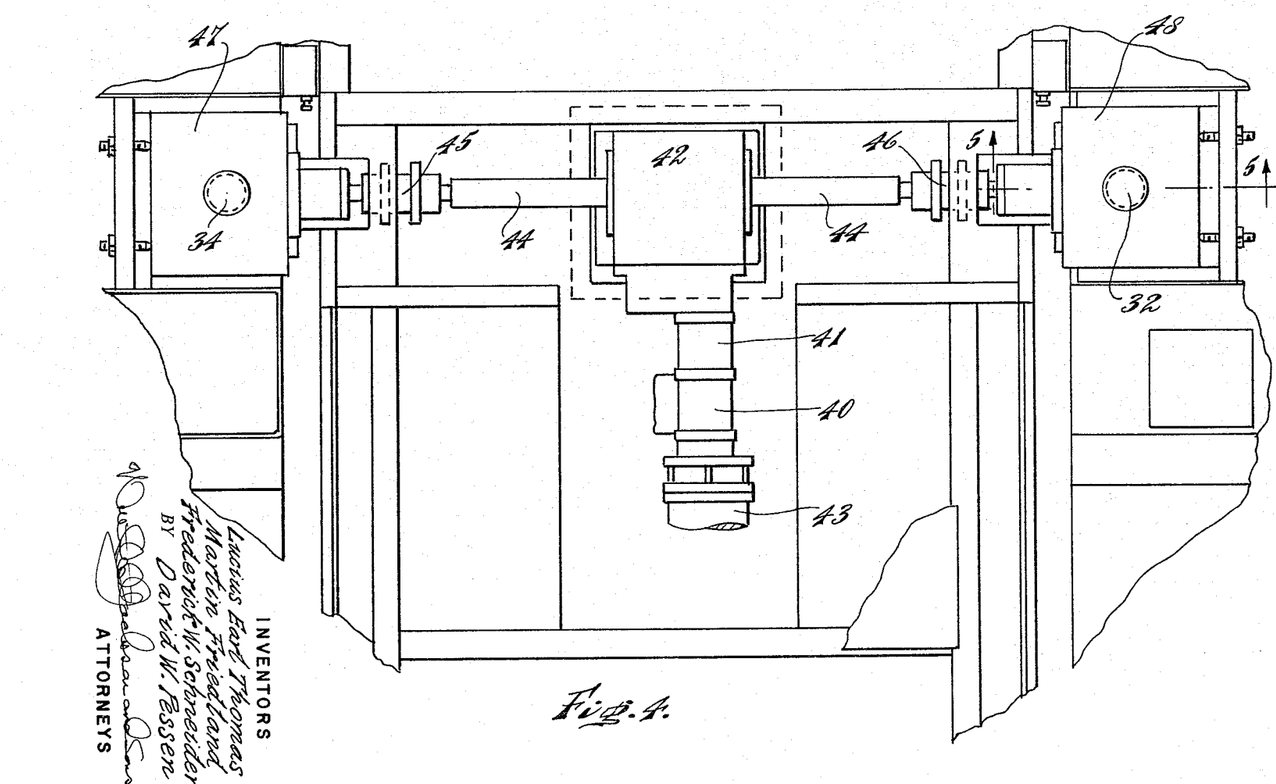
FIGURE 4 is a fragmentary plan view of the base assembly of the press of the invention with the table removed, showing the arrangement of the table drive mechanism.

Referring to FIGURE 4, a hydraulic motor 40 is connected by a flexible coupling 41 to a gear reduction 42. The second end of hydraulic motor 40 is connected directly by connection of its shaft to the shaft of feedback device 43 which continuously measures angular position and velocity of the hydraulic motor 40. The angular position is for example measured by a resolver and the velocity is measured by a tachometer. Since such devices are well known in the art, they are not further described. Tachometers and resolvers and their utilization are described in Davis and Ledgerwood, Electromechanical Components for Servomechanisms (McGraw-Hill 1961), particularly chapters 4 and 5.

The gear reduction 42 includes appropriate gears to reduce the speed of rotation and drive cross-shaft 44. The two ends of cross-shaft 44 are connected by flexible couplings 45 and 46 to gear reduction units 47 and 48, respectively. The gear reduction units 47 and 48 reduce the speed of rotation even further, and finally drive pinions 34 and 32 respectively, which in turn drive gear racks 35 and 33 respectively, thereby moving the work table 22 in the in-and-out direction.

Figure 5:
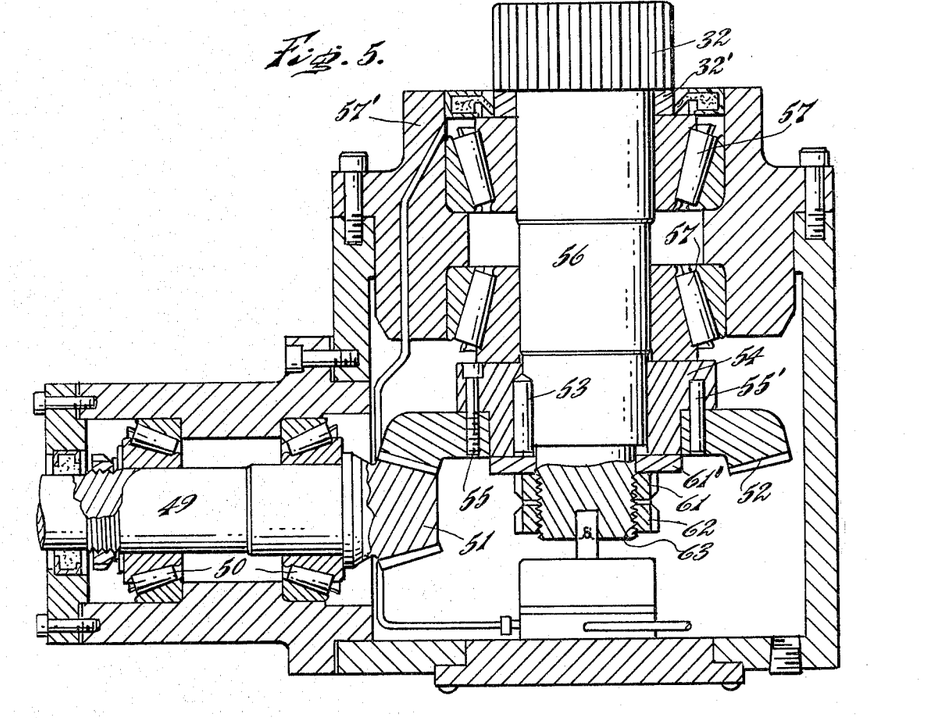
FIGURE 5 is a detailed sectional view of the gear reducer assembly, taken along the line 5—5 of FIGURE 4.

FIGURE 5 shows in detail one of the gear reduction units 47 and 48. Each unit consists of a bevel pinion shaft 49 connected to a flexible coupling 46 and supported in tapered roller bearings 50 mounted in opposed relation as well known. The end of the shaft 49 carries a bevel pinion 51 which meshes with and drives a bevel gear 52. Bevel gear 52 is rigidly connected to flange 54 by a number of screws 55 and is circumferentially positioned by a pin 55'. Flange 54 is rigidly coupled to pinion shaft 56 by means of a round key 53. Pinion shaft 56 is supported in opposed tapered roller bearings 57 and drives the pinion 32. The pinion shaft 56 has at one end a threaded portion 63 on which is secured a preloading nut 61 and a lock nut 62, these nuts bringing axial pressure through a washer 61' on the flange 54 and through it on the tapered roller bearings mounted in bearing housing 57', it being noted that the pinion 32 is larger than the bearings and acts endwise against the outboard bearing by a washer 32'. Thus by tightening the nuts 61 and 62, the bearings 57 are compressed and preloaded in the axial direction as desired.

The carriage 23 is driven in the crosswise direction by a drive mechanism substantially identical to the one just described for driving the work table 22. The only difference is that while the work table requires a cross-shaft 44 and a subsequent split drive ending in two pinions 32 and 34 driving two racks 33 and 35 respectively, the carriage 23 because of its much smaller mass and size requires only a single drive ending in one pinion and one rack. Since the carriage drive is otherwise substantially identical with the work table drive, the carriage drive is not separately described in detail.

Figure 7:
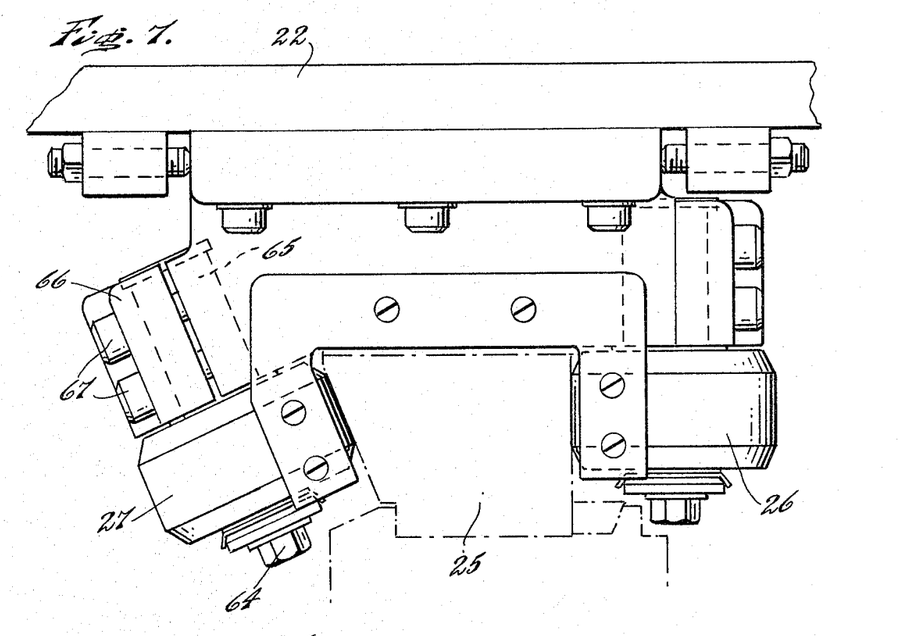
FIGURE 7 is a front elevation of the rail and roller assembly shown in FIGURES 1 to 5, illustrating the adjustment of the tilted rollers.

FIGURE 7 shows mechanism for adjusting the clearance between the tilted rollers 27 and the upwardly inclined side surface of rail 25. The tilted rollers 27 are mounted on the lower portion of an eccentric shaft 64. The upper portion 65 of this shaft is eccentric with respect to the lower portion and is clamped in a split housing 66 by means of clamping screws 67. If the eccentric shaft 64 is rotated slightly within the split housing 66, the eccentric lower portion of the shaft 64 will shift the rollers 27 toward or away from the rails 25. Thus the clearance can be reduced to practically 0 and the rollers 27 can even be pressed against the rail 25 with a preloading force.

Figure 6:
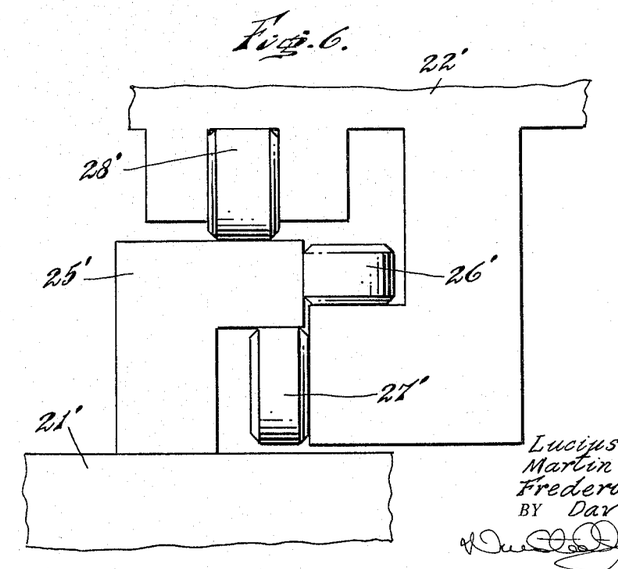
FIGURE 6 is a fragmentary front elevation showing an alternate arrangement of rail and guide rollers.

FIGURE 6 shows an alternative mechanism for preventing the work table from jumping. Base 21' supports rails 25' which guides rollers 26', 27' and 28' all attached to the table 22'. The rail is of L shape and provides upwardly directed, laterally directed and downwardly directed guiding surfaces. Instead of the tilted rollers, the rollers 27' run against the downwardly directed surface of the rail 25' and thus constrain the table in the vertical direction.

In operation of the device of the invention, when the work table is advanced to a new punching position, the control console 38 sends out an appropriate command signal which enables hydraulic unit 39 to produce hydraulic pressure and cause hydraulic motor 40 to turn in the appropriate direction. This rotational motion is transmitted through gear reduction 42, cross-shaft 44, gear reductions 47 and 48, pinions 34 and 32 and gear racks 35 and 33 to work table 22, causing the work table to roll on rails 25 toward its new desired position. During the motion of the work table, feedback device 43 continuously sends out two feedback signals to the control console 38. One of these signals represents the table velocity and the second signal represents the approximate table position. When this second signal indicates that the new correct table position has almost been reached, the control console 38 reduces the speed of table motion by a considerable amount. From then on the feedback signal generated by the position feedback pickup 58 positions the table accordingly at its correct ultimate position. Pickup 58 measures the table position very accurately in spite of any backlash between pinions 34 and 32 and their respective racks.

The above-mentioned signal representing the work table velocity is used as a stabilizing signal (velocity-feedback) in the control system, as will be well understood by those versed in the art of automatic control.

When pickup 58 indicates that the correct table position has been reached, the control console 38 causes the hydraulic motor 40 to stop rotating, so that the table will stand still. The appropriate hole will then be punched by a punch in upper turret 29 cooperating with a matching die in lower turret 30, after which the control console 38 will begin to move the table to the next hole position, repeating the procedure described above.

It will be understood that the crosswise positioning of the carriage 23 takes place in a manner identical with that described for the positioning of the work table 22. The carriage velocity and approximate position are measured by feedback device 59, while the accurate carriage position is measured by position feedback pickup 60.

The advantages of the mechanism of the invention will now be realized. By using a hydraulic motor with rack and pinion drive to drive the table, the need for long hydraulic cylinders is eliminated. By choosing tapered roller bearings containing a large number of long rollers for the pinion shaft, and by preloading these bearings in the axial direction by the proper amount, very high bearing stiffness is obtained, so that the natural frequency of the table will be very high. By driving at both ends of the table separately and in synchronism through a cross-shaft and split drive, the natural frequency of the work table is further increased. By coupling the position and velocity feedback devices directly to the rotor of the hydraulic motor, greater control-system stability is obtained. All of these factors combine to permit the use of higher control system loop gains, producing safely higher positioning speeds and greater accuracy in positioning the table. The use of a circular-pitch pinion further increases the accuracy and the use of tilted guiding rollers prevents the possibility that the table can jump at high positioning speeds. It is, therefore, possible to operate a numerically controlled turret punch press at greater speeds and with greater accuracy than in the prior art.

In view of our invention and disclosure, variations and modifications to meet individual whim or particular need will doubtless become evident to others skilled in the art to obtain all or part of the benefits of our invention without copying the structure shown, and we, therefore, claim all such insofar as they fall within the reasonable spirit and scope of our claims.

Having thus described our invention what we claim as new desire to secure by Letters Patent is:

1. In a turret punch press having a table, a table positioning mechanism comprising a gear rack rigidly attached to said table, a pinion having circular-pitch teeth and driving said rack, a rotary hydraulic motor, speed reducing means connecting said pinion to said hydraulic motor, velocity measuring feedback means directly coupled to said hydraulic motor, coarse position measuring feedback means directly coupled to said hydraulic motor, and fine position measuring feedback means directly coupled to said table.

2. In a turret punch press having a table, a table positioning mechanism comprising a gear rack rigidly attached to said table, a pinion driving said rack, a rotary hydraulic motor, a base, a set of guide rails mounted on said base, and a set of rollers attached to said table, rolling along said rails, and constraining said table in both directions vertically, in which said rails include upwardly inclined surfaces, and rollers roll on said upwardly inclined surfaces.

3. A table positioning mechanism of claim 2, in combination with means for adjusting the clearance between said set of rollers and said rails.

4. A turret punch press having a table, a table positioning mechanism comprising two parallel gear racks rigidly attached substantially at opposite ends to the table, two pinions driving said gear racks respectively, two sets of speed reducing means driving said pinions in synchronism, a cross-shaft connecting said two sets of speed reducing means, a rotary hydraulic motor, means connecting said cross-shaft to said hydraulic motor, velocity measuring feedback means directly coupled to said hydraulic motor, coarse position measuring feedback means directly coupled to said hydraulic motor, and fine position measuring feedback means directly connected to said table.

5. In a turret punch press having a table, a table positioning mechanism comprising a gear rack rigidly attached to said table, a pinion driving said rack, a shaft carrying said pinion, roller bearings supporting said shaft, said bearings having a product NL which is greater than 10D, where N is the number of rollers in the bearing, L is the axial length in inches of each roller and D is the diameter of the shaft in inches, a rotary hydraulic motor, speed reducing means connecting said pinion to said hydraulic motor, velocity measuring feedback means directly coupled to said hydraulic motor, coarse position measuring feedback means directly coupled to said hydraulic motor and fine position measuring feedback means directly coupled to said table.

6. In a turret punch press having a table, a table positioning mechanism comprising a gear rack rigidly attached to said table, a pinion driving said rack, a shaft carrying said pinion, tapered roller bearings supporting said shaft, said tapered roller bearings being preloaded in the axial direction by an amount substantially equal to $1.8R \tan \theta$, where R equals the radial bearing load in pounds, and $\theta$ equals one-half the included roller-center line angle of said tapered roller bearing, a rotary hydraulic motor, speed reducing means connecting said pinion to said hydraulic motor, velocity measuring feedback means directly coupled to said hydraulic motor, coarse positioning measuring feedback means directly coupled to said hydraulic motor, and fine position measuring feedback means directly connected to said table.

7. In a turret punch press having a table, a table positioning mechanism comprising a gear rack rigidly attached to said table, a pinion driving said rack, a rotary hydraulic motor, speed reducing means connecting said pinion to said hydraulic motor, velocity measuring feedback means directly coupled to said hydraulic motor, coarse position measuring feedback means directly coupled to said hydraulic motor, fine position measuring feedback means directly coupled to said table, a base, a set of guide rails mounted on said base, and a set of rollers attached to said table, rolling along said rails and constraining said table in both vertical directions.

8. In a turret punch press having a table, a table positioning mechanism comprising two parallel gear racks rigidly attached substantially at opposite ends of the table, two circular-pitch toothed pinions driving said gear racks respectively, a shaft carrying each pinion, tapered roller bearings supporting each shaft, said bearings providing a product NL which is greater than 10D, where N is the number of rollers in the bearing, L is the axial length of each roller, and D is the diameter of the shaft in inches, said tapered roller bearings being preloaded in the axial direction by an amount substantially equal to $1.8R \tan \theta$, where R equals the radial bearing load in pounds and $\theta$ equals one-half the included roller-center line angle of said tapered roller bearings, two sets of speed reducing means driving said pinions in synchronism, a cross-shaft connecting said two sets of speed reducing means, a rotary hydraulic motor, means connecting said cross-shaft to said hydraulic motor, velocity measuring feedback means directly coupled to said hydraulic motor, a coarse position measuring feedback means directly coupled to said hydraulic motor, a fine position measuring feedback means directly coupled to said table, a base, a set of guide rails mounted on said base, a set of rollers attached to said table rolling along said rails and constraining said table in both vertical directions, and means for adjusting the clearance between said set of rollers and said rails.

References Cited by the Examiner

UNITED STATES PATENTS

| | | | |
|---|---|---|---|
| 567,130 | 9/1896 | Goldstein | 83—409 X |
| 1,325,191 | 12/1919 | Coll | 214—1.3 |
| 1,570,928 | 1/1926 | Thomas | 214—1.3 X |
| 2,550,849 | 5/1951 | Morris | 91—76 |
| 2,638,662 | 5/1953 | Rothwell | 214—1.3 X |

OTHER REFERENCES

Palmgren, A.: Ball and Roller Bearing Engineering, printed by S. H. Burbank and Co., Inc., Philadelphia, Pa. 1945. See table 9.09 on pages 236 and 237.

MARVIN A. CHAMPION, *Primary Examiner*.